(12) United States Patent
Rao et al.

(10) Patent No.: US 7,536,434 B1
(45) Date of Patent: May 19, 2009

(54) GLOBAL DYNAMIC PERSISTENT INFORMATION ARCHITECTURE

(75) Inventors: Santhpur N. Rao, Superior, CO (US); Valerie Trapa, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 477 days.

(21) Appl. No.: 10/956,964

(22) Filed: Sep. 30, 2004

(51) Int. Cl.
G06F 15/16 (2006.01)

(52) U.S. Cl. ............... 709/202; 707/2; 707/3; 707/7; 707/104.1

(58) Field of Classification Search ........... 709/202; 707/2–3, 100, 104.1
See application file for complete search history.

(56) References Cited

U.S. PATENT DOCUMENTS

| | | | |
|---|---|---|---|
| 5,575,518 A * | 11/1996 | Payne | 294/16 |
| 5,638,494 A * | 6/1997 | Pinard et al. | 709/202 |
| 5,900,870 A * | 5/1999 | Malone et al. | 715/866 |
| 6,138,249 A * | 10/2000 | Nolet | 714/25 |
| 6,175,855 B1 * | 1/2001 | Reich et al. | 709/202 |
| 6,286,002 B1 * | 9/2001 | Axaopoulos et al. | 707/10 |
| 6,334,139 B1 * | 12/2001 | Sakakura | 709/202 |
| 6,578,005 B1 * | 6/2003 | Lesaint et al. | 705/8 |
| 6,785,691 B1 | 8/2004 | Hewett et al. | |
| 6,999,991 B1 * | 2/2006 | Ikeda | 709/202 |
| 7,124,415 B1 * | 10/2006 | Luft | 719/317 |
| 7,131,123 B2 * | 10/2006 | Suorsa et al. | 717/177 |
| 7,197,557 B1 * | 3/2007 | Asar et al. | 709/224 |
| 7,319,976 B1 * | 1/2008 | Peckover | 705/14 |
| 7,324,966 B2 * | 1/2008 | Scheer | 705/28 |
| 2001/0039562 A1 * | 11/2001 | Sato | 709/202 |
| 2002/0143598 A1 * | 10/2002 | Scheer | 705/9 |
| 2002/0161771 A1 * | 10/2002 | Boshko | 707/100 |
| 2003/0009477 A1 * | 1/2003 | Wilding et al. | 707/104.1 |
| 2003/0120672 A1 * | 6/2003 | Bingham | 707/100 |
| 2003/0204517 A1 * | 10/2003 | Skinner et al. | 707/100 |
| 2003/0212992 A1 * | 11/2003 | Ronning et al. | 717/178 |
| 2004/0002982 A1 * | 1/2004 | Ersek et al. | 707/100 |

(Continued)

OTHER PUBLICATIONS

Yolanda Villate et al, Mobile Agents For Providing Mobile Computers With Data Services, Departamento de Sistemas y Lenguajes Informaticos, Universidad del Pais Vasco, 1998, pp. 1-12.*

(Continued)

*Primary Examiner*—Apu M Mofiz
*Assistant Examiner*—Hung D Le
(74) *Attorney, Agent, or Firm*—Sheridan Ross P.C.

(57) ABSTRACT

The present invention provides various components that may be utilized in connection with an information pool. Such components may include a data source monitor that provides notification of changed data to subscribing agents. At least one read/write agent may be capable of reading the changed data from a monitored data source, and writing that changed data to the information pool. Other agents can then retrieve the changed information from the information pool for use by associated applications. A pool monitor may be provided to detect the presence of changed information in the information pool and notify an agent associated with an application. In another aspect, the information pool may be used to store services utilized by applications. Each time an application requires access to the service, an associated agent may retrieve that service. Services may be changed and added without disrupting operation of applications.

16 Claims, 4 Drawing Sheets

U.S. PATENT DOCUMENTS

| | | | |
|---|---|---|---|
| 2004/0030741 A1* | 2/2004 | Wolton et al. | 709/202 |
| 2004/0139083 A1* | 7/2004 | Hahn et al. | 707/100 |
| 2004/0139089 A1* | 7/2004 | Wells et al. | 707/100 |
| 2004/0260765 A1* | 12/2004 | Re et al. | 709/202 |
| 2005/0004927 A1* | 1/2005 | Singer | 707/100 |
| 2005/0021524 A1* | 1/2005 | Oliver | 707/100 |
| 2005/0038791 A1* | 2/2005 | Ven | 707/100 |
| 2005/0125489 A1* | 6/2005 | Hanes | 709/202 |
| 2005/0228798 A1* | 10/2005 | Shepard et al. | 707/100 |

OTHER PUBLICATIONS

Martin, David L., Cheyer, Adam J. and Moran, Douglas B., Building Distributed Software Systems with the Open Agent Architecture, SRI International, 1998, p. 1-23.*

Davis "Use JNDI to share objects between different virtual machines" JavaWorld.com, Jul. 24, 1999, 7 pages.

* cited by examiner

GLOBAL DYNAMIC PERSISTENT INFORMATION ARCHITECTURE

FIELD OF THE INVENTION

The present invention is directed to providing updated data or services to applications. In particular, the present invention is directed to providing updated data or services to applications using agents.

BACKGROUND OF THE INVENTION

In an object oriented processing system based on an object oriented language such as Java, C++ and the like, an "application" is a collection of one or more instances of objects that perform a specific function or task and an application "instance" is one specific and independent case or request for an application's functions comprising one set of the application's object instances typically running in an assigned thread of execution. Data can be passed from one object to another object within an application via arguments to methods associated with the individual objects that comprise the application. This method of data passing has the difficult requirement that cooperating objects have advance knowledge of all the data that a called object will need, as well as all the data that will be needed by any object that works with the called object.

Another method for sharing data among objects in an object oriented processing system is the Java InfoBus API. The InfoBus API facilitates data communication between objects cooperating in the same Java Virtual Machine (JVM). Using the notion of a "bus," the InfoBus API allows objects that implement it to "plug into" the bus. Any "plugged in" member of the bus can exchange information with any other member in a structured way. The downside of sharing data through the InfoBus API is the lack of data persistence and the limitation to the single JVM. Because the bus structure does not retain the data after its transmission, the data cannot be referenced at some later time.

Still another method for providing data to remote objects (i.e. objects not called directly) is to place them in a shared location. By way of example, in a Java-based object oriented processing system, the JVM executes the series of objects that comprise one or more Java applications. A static hash table can be defined that allows the application objects to store and retrieve data using hash table "key" identifiers. Defining a static hash table to provide for storage and retrieval of data is desirable because the key identifiers and values of key identifiers are unknown to objects at compile time. This method works well when only one instance of the application is running in the JVM. However, it is often desirable to run multiple instances of an application simultaneously in multiple thread groups. For example, running multiple instances of an application simultaneously in an object oriented environment can be used to advantage in a telephone call center. Multiple incoming calls at the call center require simultaneous processing. This processing can be implemented by spawning new application instances as new calls arrive. The processing of multiple calls thus results in the simultaneous execution of multiple instances of the same application. A problem arises relative to data sharing in this situation, because each application instance cannot have its own static hash table. A static hash table is a "class" variable such that only one such table can reside within the JVM. Nor can multiple instances of an application running within a single JVM use the same static hash table to store local copies of data. Each application may require the placement of different information in the hash table, and this can lead to data collisions.

In enterprise wide systems, there is a need to add or update data and services and to notify collaborating applications of the change. In addition, such global information needs to be persistent to survive application fail-over. However, implementation of such features is complex, frequently requires third party products, and can adversely affect system availability.

Existing systems typically use a startup class or script that is called when the service is started to load configuration parameters that need to be shared by multiple applications running in the server. However, this approach requires that the server be restarted whenever configuration parameters are changed. This in turn results in system outage that may not be tolerable from an operational perspective.

Alternatively, parameters can be loaded in a deployment descriptor of a designated application and then shared programmatically by the application. To change a parameter, the deployment descriptor needs to be modified, the applications need to be built, regression tested, and deployed. Accordingly, there is inherent risk in this approach that errors will be introduced. In addition, significant resources are required in order to implement a changed parameter. This technique is also limited because the change is not propagated outside the application.

Applications often use services that are updated periodically. For example, services may be updated to include new software patches, agents, libraries, etc. In order to implement new services or service releases, an application must be repackaged and redeployed. This necessarily involves application downtime. Accordingly, system availability is impacted.

There frequently is a need to communicate an event to all collaborating applications, whether those applications are local or distributed. For example, distributed collaborating applications need to know when a user logs off so they can perform clean up activities such as closing product connections, terminating processes, and releasing resources. Typically, there is no inherent mechanism to notify collaborating applications of an event. Notifications can be performed via messaging or RMI techniques, but these increase application and deployment complexity. For messaging, third party products have also been required.

In connection with distributed computing, a task, for example solving an n-dimensional equation, may be divided between multiple applications hosted on different parts of the network, and each application may access to unique pieces of information. Applications may need to communicate to solve the equation collaboratively with possible processing order dependencies. New applications may need to be introduced in connection with additional available information or processing. In a typical distributed computing system, a controller manages workflow. Communication mechanisms between applications include messaging, RMI, SOAP, and SMTP. If the work flow changes, the controller application needs to be modified. This requires development, test, and deployment effort. In addition, system availability may be impacted.

Although systems for supporting data sharing between applications and application instances have been developed, such systems have typically been incapable of providing updated data to applications without impacting availability. In addition, systems have lacked change notification with respect to internal and external data sources. Although other systems have used persistence techniques, they typically do not address efficient communication of changed data to applications. Other systems allow services to be shared through registration and discovery. However, such registration and discovery processes can require significant resources.

SUMMARY OF THE INVENTION

The present invention is directed to solving these and other problems and disadvantages of the prior art. In accordance with embodiments of the present invention, a global information architecture is provided. As used herein, information refers to data and/or services. The architecture features a global information pool for the storage of new or updated data and/or services. Agents associated with applications may function to retrieve information as needed by the applications. In addition, agents may retrieve data from a data source and place that data in the information pool. Data monitors may be provided to indicate to subscribing agents the availability of new or updated data at a data source. Pool monitors may be provided to indicate to subscribing agents the availability of new or updated information in the information pool.

In accordance with embodiments of the present invention, a data source monitor is associated with a data source. The data source monitor operates to detect new or changed data. In response to detecting new or changed data, the monitor notifies one or more subscribing agents, each or which is associated with an application. In accordance with further embodiments of the present invention, at least one of the agents is capable of retrieving the new or changed data and placing that data in the information pool, making that data available to other agents.

In accordance with other embodiments of the present invention, a pool monitor is associated with the information pool. The pool monitor operates to detect new or changed data, or new or changed services, that are available from the information pool. In response to detecting new or changed data, or new or changed services, the monitor notifies one or more subscribing agents, each of which is associated with an application, of the new or changed information.

In accordance with still other embodiments of the present invention, a persistent information pool from which agents may retrieve new or updated services for applications may be provided. Such embodiments permit an application to utilize a new or updated service without interrupting operation or availability of the application.

Additional advantages and features of the present invention will become more readily apparent from the following description, particularly when taken together with the accompanying drawings.

DETAILED DESCRIPTION

Figure 1:
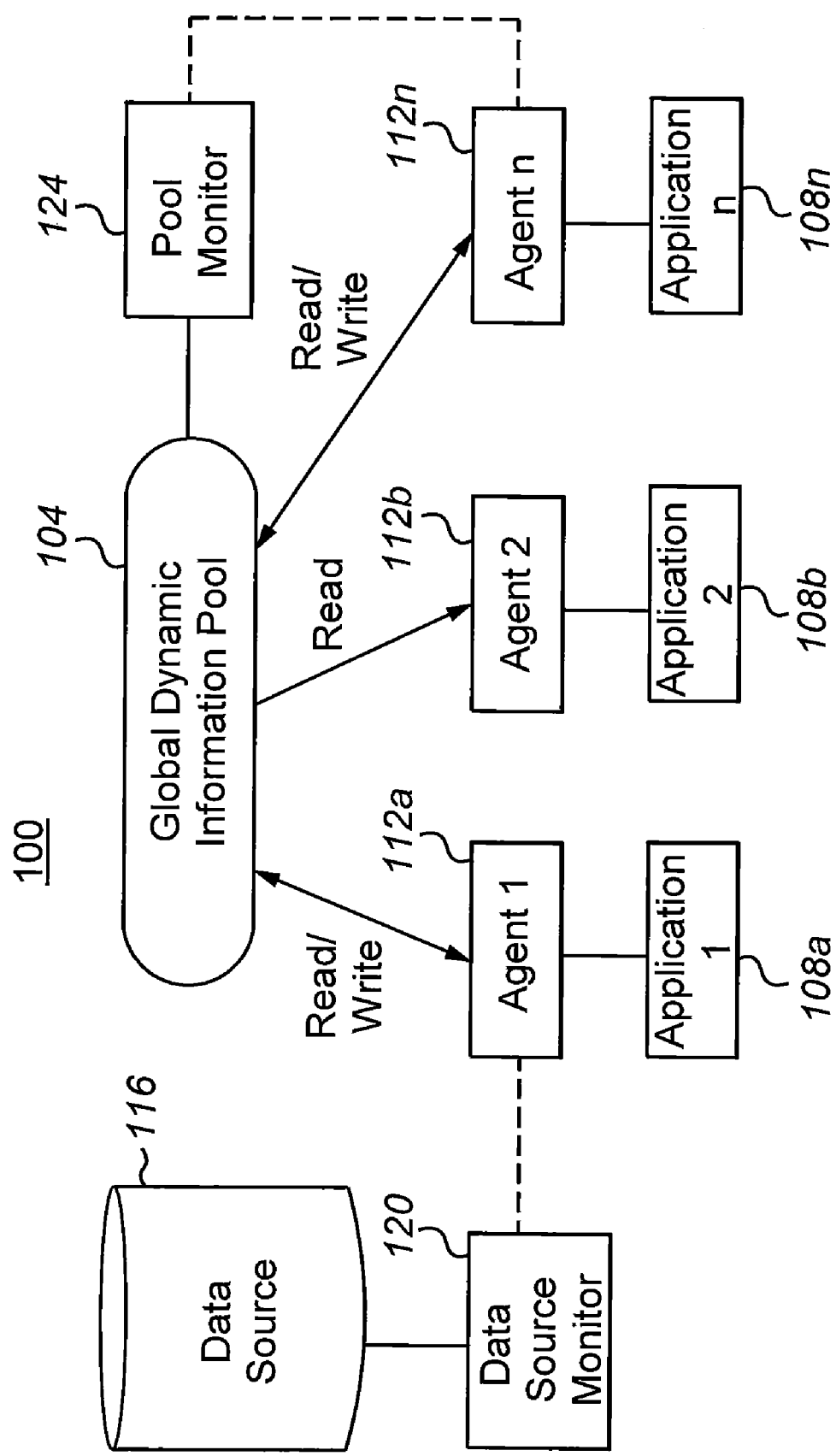
FIG. 1 is a block diagram depicting components of a system implementing a global dynamic persistent information architecture in accordance with embodiments of the present invention.

With reference now to FIG. 1, a system 100 implementing a global dynamic persistent information architecture in accordance with embodiments of the present invention is depicted in block diagram form. In general, the system includes an information pool 104. As used herein, the term information may include data and/or services. The information pool therefore contains data and/or services. The system 100 also generally contains one or more applications 108*a*-*n*. Each application 108 may be associated with an agent 112*a*-*n* that is at least capable of reading from the information pool 104.

In accordance with embodiments of the present invention, the system 100 may also include a data source 116. The data source 116 is associated with a data source monitor 120. In accordance with still other embodiments of the present invention, the system 100 may include a pool monitor 124 associated with the information pool 104.

The information pool 104 may be implemented as a location or set of locations in memory. Accordingly, the information pool 104 may comprise a shared location that can be accessed by agents 112 for use by associated applications 108. The information pool 104 may be capable of maintaining data or complex objects like services. In addition, the information pool 104 may be persistent.

An application 108 relies on or makes use of data and/or services, including data and/or services that can be maintained in the information pool 104. Furthermore, the system 100 can include multiple instances of an application 108, which may or may not require different data or services from one another.

An agent 112 generally performs functions in support of or on behalf of an associated application 108. The functions performed by an agent 112*a*-*n* may include the ability to read information from the information pool 104. For example, the first, second and nth agents 112*a*, 112*b* and 112*n* in FIG. 1 all have the ability to read information from the information pool 104. Additional functions that may be performed by an agent 112 include the ability to write information to the information pool 104. For example, the first and nth agents 112*a* and 112*n* have the ability to write information to the information pool 108. Such information may include new or changed data from a data source 116, or new or changed data from an application 108. In addition, an agent 112 may function to receive notifications from a data source monitor 120 and/or a pool monitor 124 related to the availability of new or changed information. Accordingly, an agent 112 shields an associated application 108 from needing to be aware of the implementation details required for persistence and change notification.

A data source 116 may be any source of information. In general, a data source 116 is external to an application 108. For example, the data source 116 may comprise a file, database or other source of information. As further examples, the data source 116 may comprise an application server, a database server, or a data stream. In addition, the data source 116 may comprise a number of different data source types, such as a database in combination with an application.

A data source monitor 120 generally serves to detect changes in monitored data in or associated with a data source 116, and alerts agents 112 appropriately. In particular, the data source monitor 120 may notify subscribing agents 112 that data has been changed or is newly available. Accordingly, the data source monitor 120 may communicate with one or more agents 112 when new or updated data, is available from the data source 116 that the data monitor 120 is monitoring. In accordance with embodiments of the present invention, there is a corresponding data monitor class for each type of item to be monitored (e.g., file or data record). In accordance with other embodiments of the present invention, one data monitor 120 is associated with each monitored data source 116. A data monitor 120 may also provide a callback notification interface.

A pool monitor 124 generally serves to detect changes in information maintained in connection with a monitored information pool 104. In particular, the pool monitor 124 may notify subscribing agents 112 that data has been changed or is newly available. Accordingly, the pool monitor 124 may communicate with one or more agents 112 when new or updated information, including new or updated data or a new or updated service is available from or referenced by the data pool 120. In accordance with embodiments of the present invention, one pool monitor 124 is associated with each information pool 104.

A system 100 in accordance with embodiments of the present invention may be implemented in various environments. For example, a system 100 may comprise an information pool 104 implemented as a Java Directory Naming Service (JNDI), and Java applications 112 running in separate Java virtual machines. As a further example, a data source monitor 120 or a pool monitor 124 may comprise specialized Java applications.

Figure 2:
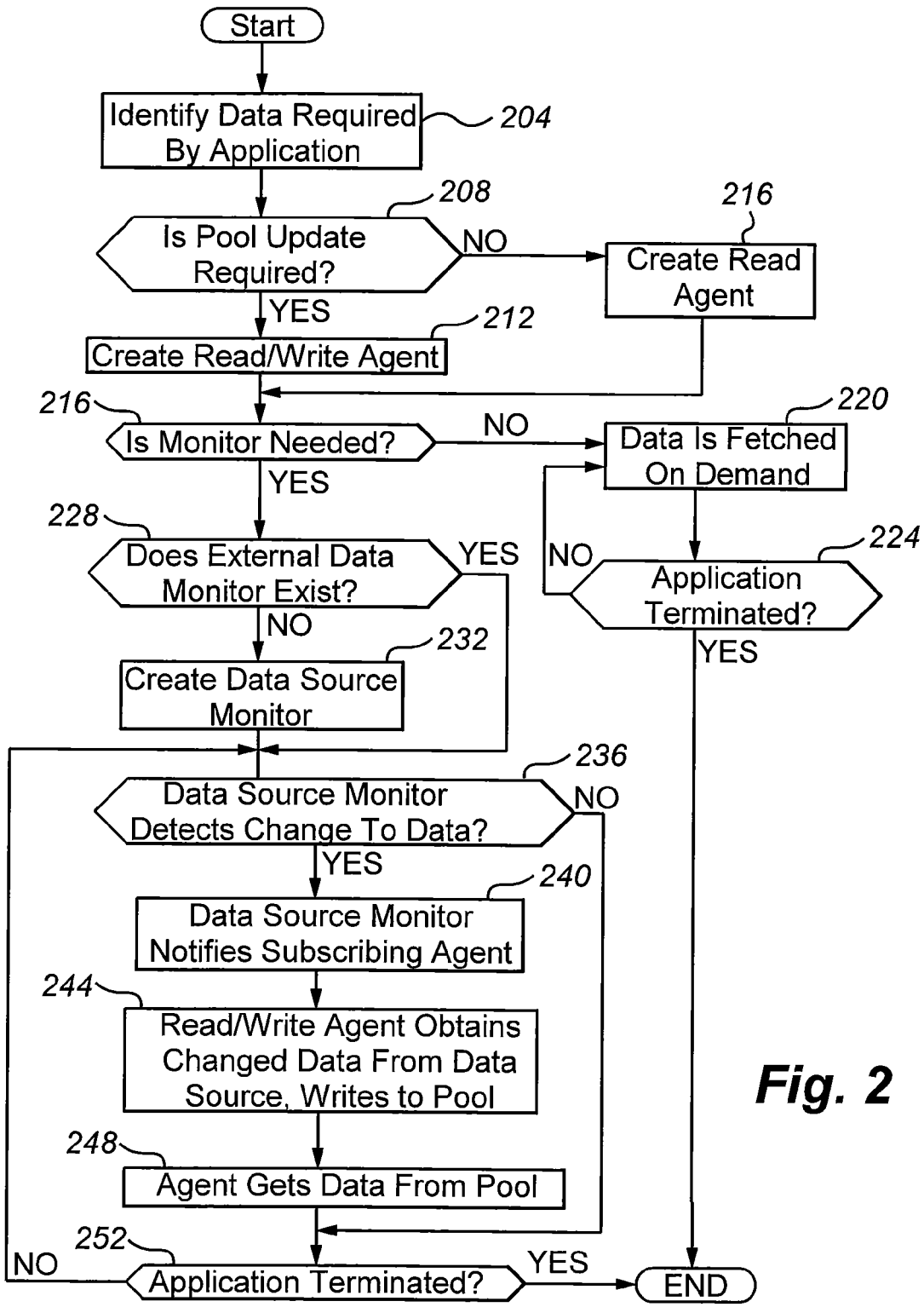
FIG. 2 is a flow chart depicting aspects of the operation of a system in accordance with embodiments of the present invention.

With reference now to FIG. 2, aspects of the operation of a system 100 capable of making new or updated data from a data source 116 available to applications 108 in accordance with embodiments of the present invention are depicted. Initially, data required by an application 108 is identified (step 204). A determination may then be made as to whether an update to the information pool 104 is required (step 208). If updating of the information pool 104 is required, a read/write agent 112 may be created (step 212). If updating of the information pool 104 is not required, a read only agent 112 may be created (step 216). After the creation of an agent 112 at step 212 or step 216, a determination may be made as to whether a monitor is needed (step 216). If a monitor is not needed, then data is fetched by an agent 112 on demand (step 220). Accordingly, provided that another agent 112 or entity had placed new or updated data in the information pool 104, an agent 112 that reads that data from the information pool 104 each time an associated application 108 needs the data will always have access to the latest version of the data. In a system 100 in which data is fetched on demand, the processing of fetching data on demand may continue until a determination is made at step 224 that the application 108 has been terminated.

If it is determined that a monitor is needed, a determination may next be made as to whether an external data monitor 120 exists (step 228). If a data source monitor 120 does not exist, a data source monitor 120 is created at step 232. If it is determined at step 228 that an external data monitor 120 exists, or after creating a data source monitor 120 at step 232, a determination may be made as to whether the data source monitor 120 detects a change to monitored data (step 236). In general, a data source monitor 120 may function to observe an associated data source 116 to determine whether monitored data has been updated or is newly available. If the data source monitor 120 detects a change to monitored data, the data source monitor 120 notifies a subscribing agent 112. After receiving notification from a data source monitor 120 that changed data is available, a notified read/write agent 112 (e.g. agent 112a in FIG. 1) obtains the changed data from the data source 116, and writes that data to the information pool 104 (step 244). At step 248, an agent 112, including a read only agent 112 or a read/write agent 112 other than the one that obtained the changed data from the data source 116, may then retrieve the changed data directly from the information pool 104.

After obtaining data from the information pool 104, or after a determination that a data source monitor 120 has not detected a change to monitored data, a determination may be made as to whether the application 108 has been terminated (step 252). If the application has not been terminated, the process may return to step 236. If the application has been terminated, the process may end.

As can be appreciated by one of skill in the art from the description provided herein, embodiments of the present invention permit the retrieval of data from a data source 116 by a single agent 112 having read/write capabilities. After the agent 112 retrieving data from the data source 120 has written that data to the information pool 104, other agents 112, including agents 112 that are not capable of reading data from the data source 116, can obtain the changed data from the information pool 104. Accordingly, the additional capabilities required of agents 112 to read data directly from a data source 120, and the additional network traffic that can result in connection with retrieving data directly from a remote data source 116, can be reduced.

Figure 3:
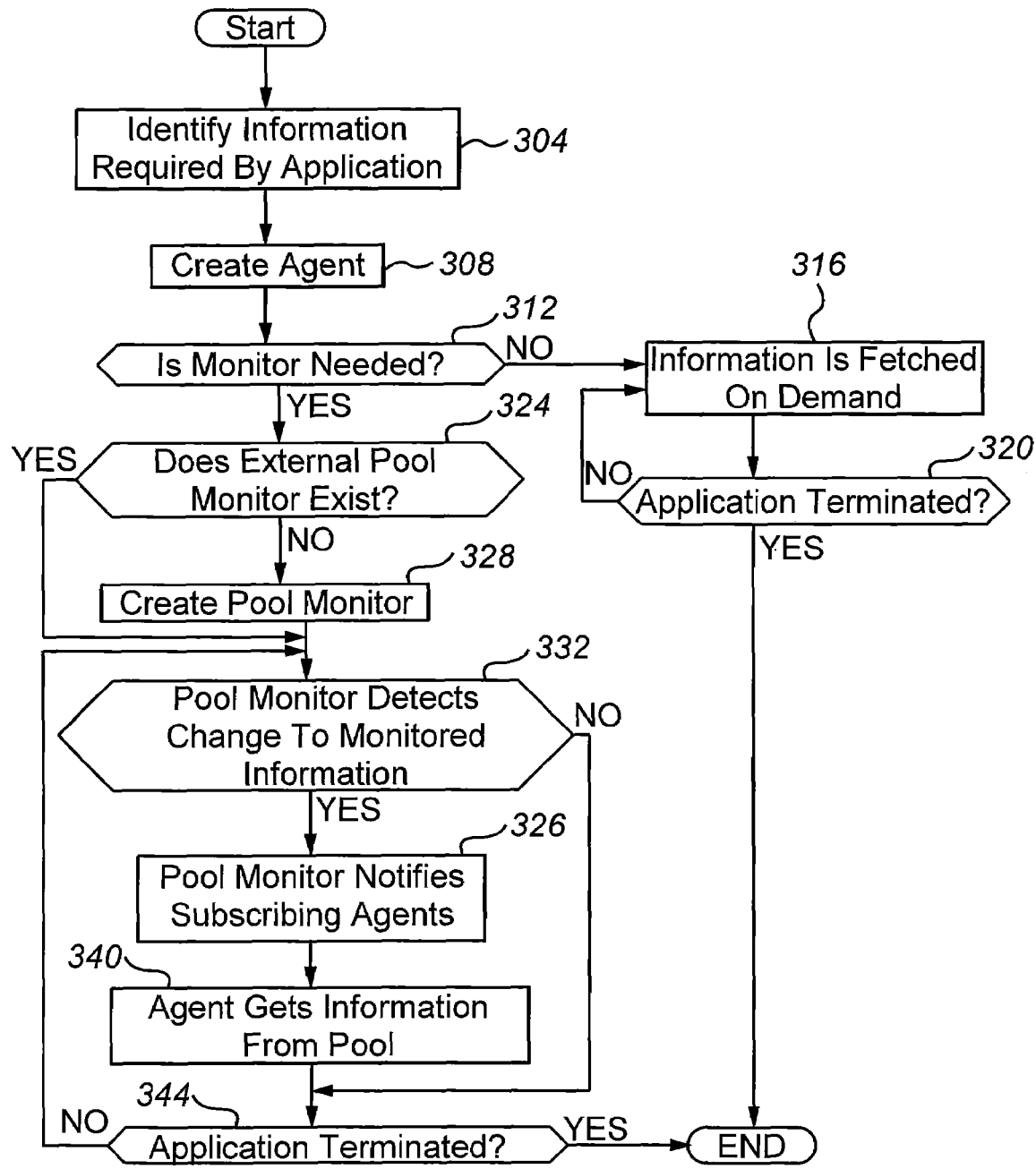
FIG. 3 is a flow chart depicting aspects of the operation of a system in accordance with other embodiments of the present invention.

With reference now to FIG. 3, aspects of the operation of a system 100 providing notification to agents 112 of the availability of new or updated information, including data or services, from the information pool 104, in accordance with embodiments of the present invention are illustrated. After starting the system, information required by an application 108, may be identified (step 304). An agent 112 may then be created (step 308). In accordance with embodiments of the present invention, an agent 112 does not need to have write capabilities.

At step 312, a determination may be made as to whether a monitor is needed (step 312). If it is determined that a monitor is not needed, information may be fetched by the agent 112 on demand (step 316). The agent 112 may continue to fetch information as required by an associated application 104 until the application 104 is terminated (step 320), at which time the process may end.

If it is determined at step 312 that a monitor is needed, a determination may next be made as to whether an external pool monitor 124 exists (step 324). If an external pool monitor 124 does not exist, the pool monitor 124 may be created (step 328). After creating an external pool monitor 124 at step 328, or after determining that an external pool monitor 124 exists, a determination may be made as to whether the pool monitor 124 detects a change to monitored information (step 332). If a change to monitored information is detected, the pool monitor 124 notifies subscribing agents 112 (step 336). An agent 112 may then get information from the information pool 104 (step 340). Retrieving information from the information pool 104 may therefore be performed only when the pool monitor 124 notifies a subscribing agent 112 that changed information, such as updated or newly available data or services, has been written to the information pool 104. Accordingly, a pool monitor 124 may function to ensure that applications 108 are provided with changed information when such information is available, while allowing applications 108 to run using locally stored versions of information in the absence of a change to such information. Accordingly, the need for agents 112 to retrieve information from the information pool 104 can be reduced.

After the agent 112 has gotten the changed information from the information pool 104, or after determining that the pool monitor 124 has not detected a change to monitored information, a determination may be made as to whether the application 108 has been terminated (step 344). If the application has not been terminated, the process may return to step 332. If the application 108 has been terminated, the process may end.

As can be appreciated by one of skill in the art from the description provided herein, a pool monitor 124 can operate in conjunction with a data source monitor 120. For example, a data source monitor 120 can notify a subscribing agent 112 having read/write capabilities of changed data in the data source 116. The agent 112 having read/write capabilities, upon receiving notification of the availability of changed data, may read that data from the data source 116, and write that data to the information pool 104 so that it can be retrieved by other agents 112. The other agents 112 can be notified of the availability of the changed data by the pool monitor 124. In addition, as noted above, a pool monitor 124 can notify agents 112 of the availability of other information from the information pool 104, such as new or changed services.

Figure 4:
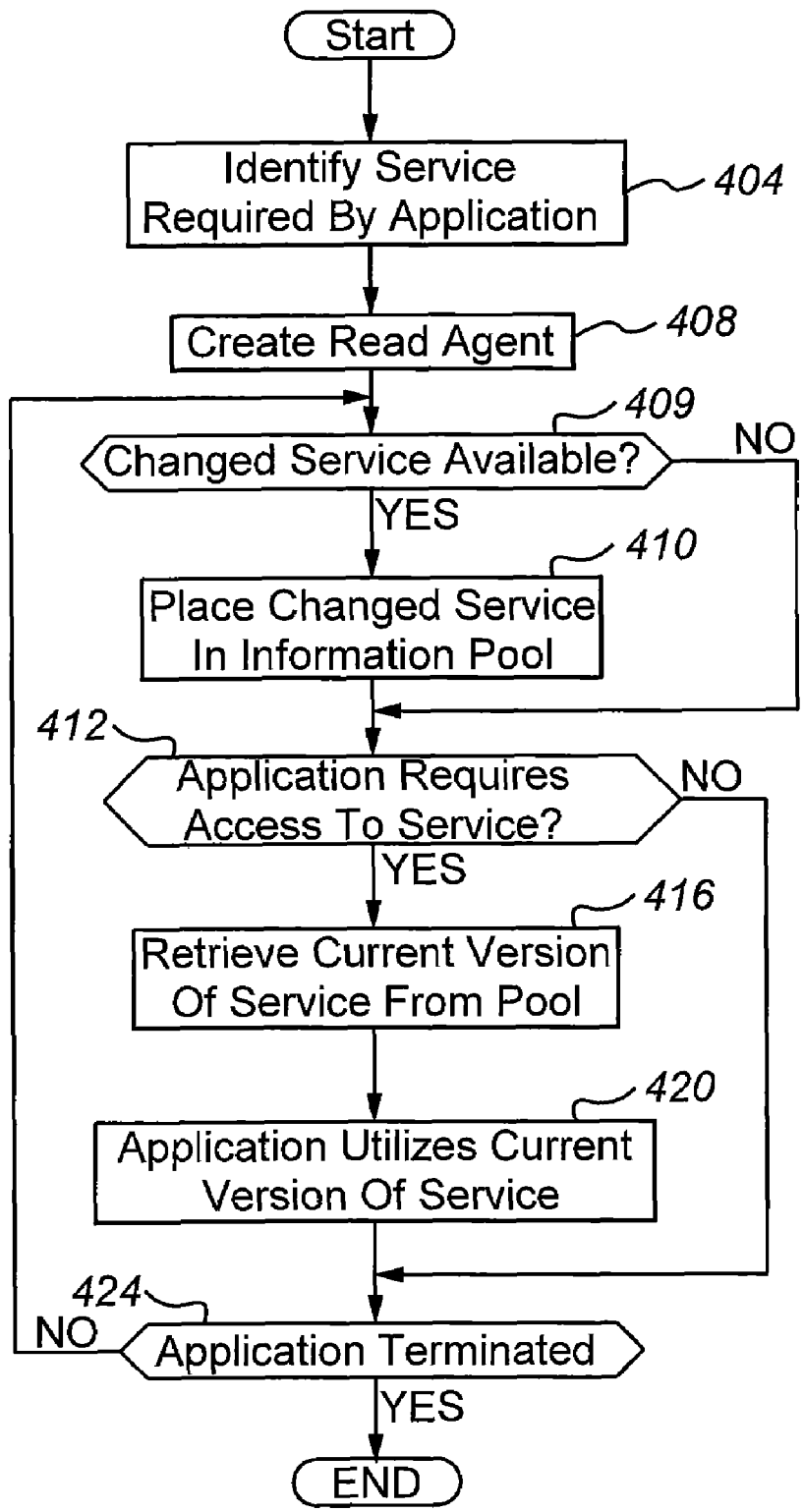
FIG. 4 is a flow chart depicting aspects of the operation of a system in accordance with other embodiments of the present invention.

With reference now to FIG. 4, the operation of embodiments of the present invention in providing changed services, including newly available or updated services to applications 108, is depicted. After starting the system, a service that is required by an application 108 is identified (step 404). As can be appreciated by one of skill in the art, a service may include a complex object, such as a process. In addition, an agent 112 having read capabilities is created (step 408).

At step 409, a determination may be made as to whether a changed service, such as an updated or newly available service, is available. If a changed service is available, the changed version of the service is placed in the information pool 104 (step 410). Accordingly, the information pool 104 may make available the latest version of a service. After placing the changed information in the information pool 104, or after determining that a changed version of the service is not available, the process may proceed to 412.

At step 412, a determination may be made as to whether the application 108 requires access to the identified service. If access to the service is required, the current version of the service is retrieved by the associated agent 112 from the information pool 104 (step 416). The application 108 then utilizes the current version of the service, retrieved from the information pool 104 (step 420). After retrieving and applying the changed service at steps 416 and 420, or after determining that the application 108 does not require access to the identified service, a determination may be made as to whether the application 108 has been terminated (step 424). If the application 108 has not been terminated, the process may return to step 409.

As can be appreciated by one of skill in the art from the description provided herein, the process steps described in connection with FIG. 4 can be repeated for each application 108 in a system 100. In addition, the process illustrated in connection with FIG. 4 may be repeated for each service utilized by an application 108.

In connection with the utilization of a changed service by an application 108, it should be noted that embodiments of the present invention do not require that the application 108 be restarted. Accordingly, new services can be utilized without disruption of the system 100.

Although various components of systems 100 in accordance with embodiments of the present invention have been described in particular examples, it should be appreciated that embodiments are not so limited. In particular, various combinations of elements may be used in connection with a particular implementation of a system. In addition, although various correspondence between components of the present invention have been described, embodiments of the present invention are not so limited. For example, an application 108 may be associated with more than one agent 112. As another example, different agents may function in connection with different pieces of information used by an application 108. As a further example, multiple data sources 116 may be associated with an information pool 109. Also, multiple pool monitors 124 may be associated with an information pool 104, for example to monitor different information.

It should also be appreciated that not all of the described components need to be included in each embodiment of a system 100. For example, a system 100 may include an information pool 104, one or more applications 108, one or more agents 112, one or more data sources 116, and one or more data monitors 120. As another example, a system 100 may include an information pool 104, one or more applications 108, one or more agents 112, and one or more pool monitors 124. As still another example, a system 100 may include an information pool 104, one or more applications 108, and one or more agents 112, in which the applications 108 use services available from the information pool 104. Other combinations of components are also possible and within the scope of embodiments of the present invention.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A system for distributing information to a plurality of applications, comprising:

a data source;

memory, wherein a common information pool is formed in said memory;

a data source monitor comprising a set of instructions stored on a computer-readable medium operable to detect changes in at least first information stored in said data source;

a first agent comprising a set of instructions stored on a computer-readable medium interconnected to said data source, to said common information pool and to said data source monitor, wherein said first agent is a read/write agent; and a first application comprising a set of instructions stored on a computer-readable medium, wherein said first application is interconnected to but distinct from said first agent, wherein said set of instructions of said first application is distinct from said set of instructions of said first agent, wherein said first application does not itself operate to obtain changed information from said data source, wherein in response to receiving an indication from said data source monitor of a change in said first information said first agent obtains said changed information from said data source and writes said changed information to said common information pool and provides said changed information to said first application, wherein said first application is updated, wherein said first agent includes a first subscribing agent, wherein said first agent is an intermediary between said data source and said first application, and wherein said first agent is an intermediary between said data source and said common information pool;

a common information pool monitor comprising a set of instructions stored on a computer-readable medium operable to detect changed information in said common information pool;

a second agent comprising a set of instructions stored on a computer-readable medium interconnected to said common information pool and to said common information pool monitor;

a second application comprising a set of instructions stored on a computer readable medium, wherein said second application is interconnected to but distinct from said second agent, wherein said second application does not itself operate to obtain changed information from said common information pool, wherein in response to receiving an indication from said common information pool monitor that said changed information is available in said common information pool said second agent obtains said changed information from said common information pool and provides said changed information to said second application, wherein said second application is updated, and wherein said second agent is an intermediary between said common information pool and said second application.

2. The system of claim 1, wherein said second agent includes a second subscribing agent.

3. The system of claim 2, wherein said second subscribing agent comprises a read only agent.

4. A method for distributing information to a plurality of applications, comprising:

monitoring information in a monitored data source using a first data source monitor;

detecting using said first data source monitor a change of a first type associated with said monitored information, wherein said detecting a change of a first type does not include detecting an event notification; and notifying at least a first agent associated with but distinct from a first application of said change of said first type associated with said monitored information in a monitored data source, wherein said at least a first agent performs an action in response to said notification of said change of a first type, wherein said action performed by said at least a first agent comprises:

retrieving changed information from said monitored data source and placing said changed information in an information pool; and providing said first application with said changed information, wherein said first agent is an intermediary between said monitored data source and said first application, wherein said first agent is an intermediary between said information pool and said first application, and wherein said first agent is an intermediary between said monitored data source and said information pool;

monitoring information in said information pool using an information pool monitor;

detecting using said information pool monitor a change to information in said information pool;

notifying at least a second agent associated with but different from a second application of said change to information in said information pool;

retrieving by said second agent changed information from said information pool.

5. The method of claim 4, wherein said change of a first type comprises an update to information comprising data.

6. The method of claim 4, wherein said change of a first type comprises availability of new data.

7. The method of claim 4, wherein said change of a first type comprises availability of new data or availability of updated data from a data source.

8. The method of claim 4, wherein said changed information comprises new data or updated data.

9. The method of claim 4, wherein said changed information comprises a new service or an updated service.

10. The method of claim 4, wherein said method is implemented by a computational component comprising a computer readable storage medium containing instructions for performing the method.

11. The method of claim 4, wherein said method is implemented by a computational component comprising a logic circuit.

12. A global dynamic persistent information system, comprising:

information source means maintained in a computer-readable medium;

means for monitoring said information source means to detect at least a first change associated with said information source means and for generating a first notification of a detected at least a first change in information a said information source means;

first means for receiving and acting on said first notification of a detected at least a first change in information in said information source means;

information pool means;

first means for applying information, wherein in response to said notification of a detected at least a first change in information in said information source means said first means for receiving and acting on said first notification of a detected at least a first change in information in said information source means obtains changed information from said information source means and provides said changed information to said first means for applying information and to said information pool means, wherein said first means for applying information and said information pool means are updated, and wherein said first means for applying information is distinct from said means for receiving and acting on said notification of a detected at least a first change;

means for monitoring said information pool means to detect at least a first change associated with said information pool means and for generating a notification of a detected at least a first change in said information pool means;

second means for receiving and acting on said notification of a detected at least a first change in said information pool means;

second means for applying information, wherein in response to said notification of at least a first change in said information pool means said second means for receiving and acting obtains said changed information from said information pool means and provides said changed information to said second means for applying information.

13. The system of claim 12, further comprising:
second information means, wherein said first means for receiving and acting on said notification of a detected at least a first change stores changed information in said second information means.

14. The system of claim 12, wherein said first information means originates information.

15. The system of claim 12, wherein said first information means makes information available to a plurality of means for applying information.

16. A system for distributing information to a plurality of applications, comprising:
 a first data source;
 a data source monitor;
 a first data pool in memory;
 at least a first service stored in said first data pool;
 a data pool monitor comprising a set of instructions stored on a computer-readable medium;
 a first agent comprising a first set of instructions stored on a computer-readable medium in communication with said first data pool; and
 a first application comprising a second set of instructions stored on a computer-readable medium associated with said first agent, said first application utilizing said first service, wherein in response to detection of an alteration or replacement of said first service by said data source monitor, said first agent obtains said altered or replacement first service and provides said altered or replacement first service to said first application and said first application loads said first service without interruption of operation of said first application, and wherein said first agent also provides said altered or replacement first service to said first data pool;
 a second agent comprising a third set of instructions stored on a computer readable medium in communication with said first data pool;
 a second application comprising a fourth set of instructions stored on a computer-readable medium associated with said second agent, wherein in response to detection of an alteration or replacement of said first service by said data pool monitor, said second agent obtains said altered or replacement first service and provides said altered or replacement first service to said second application.

\* \* \* \* \*